(12) United States Patent
Xie et al.

(10) Patent No.: US 10,552,891 B2
(45) Date of Patent: Feb. 4, 2020

(54) SYSTEMS AND METHODS FOR RECOMMENDING COLD-START ITEMS ON A WEBSITE OF A RETAILER

(71) Applicant: WAL-MART STORES, INC., Bentonville, AR (US)

(72) Inventors: Min Xie, Foster City, CA (US); Kannan Achan, Saratoga, CA (US); Zoheb Vacheri, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 383 days.

(21) Appl. No.: 15/420,479

(22) Filed: Jan. 31, 2017

(65) Prior Publication Data

US 2018/0218428 A1 Aug. 2, 2018

(51) Int. Cl.
*G06Q 30/00* (2012.01)
*G06Q 30/06* (2012.01)
*G06Q 10/06* (2012.01)
*G06N 20/00* (2019.01)

(52) U.S. Cl.
CPC ......... *G06Q 30/0631* (2013.01); *G06N 20/00* (2019.01); *G06Q 10/067* (2013.01)

(58) Field of Classification Search
None
See application file for complete search history.

(56) References Cited

U.S. PATENT DOCUMENTS

| | | | |
|---|---|---|---|
| 6,912,505 B2 | 6/2005 | Linden et al. | |
| 2011/0112981 A1 | 5/2011 | Park et al. | |
| 2011/0184831 A1* | 7/2011 | Dalgleish | G06Q 30/02 705/26.7 |
| 2011/0282821 A1* | 11/2011 | Levy | G06Q 30/0631 706/47 |
| 2013/0083999 A1* | 4/2013 | Bhardwaj | G06Q 30/0643 382/165 |
| 2015/0073931 A1* | 3/2015 | Ronen | G06Q 30/0631 705/26.7 |
| 2015/0339759 A1* | 11/2015 | Pope | G06F 16/2423 705/26.62 |
| 2017/0061286 A1* | 3/2017 | Kumar | G06Q 30/0269 |
| 2017/0124624 A1* | 5/2017 | Agrawal | G06Q 30/0631 |
| 2017/0140262 A1* | 5/2017 | Wilson | H04L 67/42 |

* cited by examiner

*Primary Examiner* — Mila Airapetian
(74) *Attorney, Agent, or Firm* — Bryan Cave Leighton Paisner LLP (57) ABSTRACT

Systems and methods including one or more processing modules and one or more non-transitory storage modules storing computing instructions configured to run on the one or more processing modules and perform acts of training one or more first models to recommend a first item after a user has had an interaction on the web site of the online retailer with a second item, determining static features common to both the first item and the second item, training a second model to determine whether to coordinate a display of any new item as one of one or more recommended items with any of a plurality of items, and coordinating the display of the new item as one of the one or more recommended items when the one or more of the plurality of items are displayed on the website of the online retailer based on the static features of the new item.

20 Claims, 5 Drawing Sheets

SYSTEMS AND METHODS FOR RECOMMENDING COLD-START ITEMS ON A WEBSITE OF A RETAILER

TECHNICAL FIELD

This disclosure relates generally to recommending cold-start items on a website of an online retailer.

BACKGROUND

Many online retailers often include recommended items on a webpage for a particular anchor item. To determine which items should be recommended on a webpage for the particular anchor item, the online retailer typically needs access to historical transaction data. For example, for each user of the online retailer, the online retailer finds similar users who have viewed or purchased similar items. This process, however, does not work for cold-start items because cold-start items have little or no historical data that can be observed to allow the retailer to make a recommendation.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of training, using a historical traffic pattern of a plurality of items on a website of an online retailer, one or more first models to recommend one or more first items of the plurality of items for sale on a website of the online retailer after a user has had an interaction on the web site of the online retailer with one or more second items of the plurality of items. The one or more storage modules also can be configured to run on the one or more processing modules and perform an act of determining static features common to both the one or more first items and the one or more second items. The one or more storage modules also can be configured to run on the one or more processing modules and perform an act of training, using the static features of the one or more first items and the one or more second items, a second model to determine whether to coordinate a display of any new item as one of one or more recommended items with any of the plurality of items. The one or more storage modules also can be configured to run on the one or more processing modules and perform an act of determining, using the second model and one or more static features of the new item, whether to coordinate a display of the new item as one of the one or more recommended items when one or more of the plurality of items are displayed on the website of the retailer. The one or more storage modules also can be configured to run on the one or more processing modules and perform an act of coordinating the display of the new item as one of the one or more recommended items when the one or more of the plurality of items are displayed on the website of the online retailer based on using the second model and the one or more static features of the new item.

Various embodiments include a method. The method can include training, using a historical traffic pattern of a plurality of items on a website of an online retailer, one or more first models to recommend one or more first items of the plurality of items for sale on a website of the online retailer after a user has had an interaction on the website of the online retailer with one or more second items of the plurality of items. The method also can include determining static features common to both the one or more first items and the one or more second items. The method also can include training, using the static features of the one or more first items and the one or more second items, a second model to determine whether to coordinate a display of any new item as one of one or more recommended items with any of the plurality of items. The method also can include determining, using the second model and one or more static features of the new item, whether to coordinate a display of the new item as one of the one or more recommended items when one or more of the plurality of items are displayed on the web site of the retailer. The method also can include coordinating the display of the new item as one of the one or more recommended items when the one or more of the plurality of items are displayed on the web site of the online retailer based on using the second model and the one or more static features of the new item.

Figure 1:
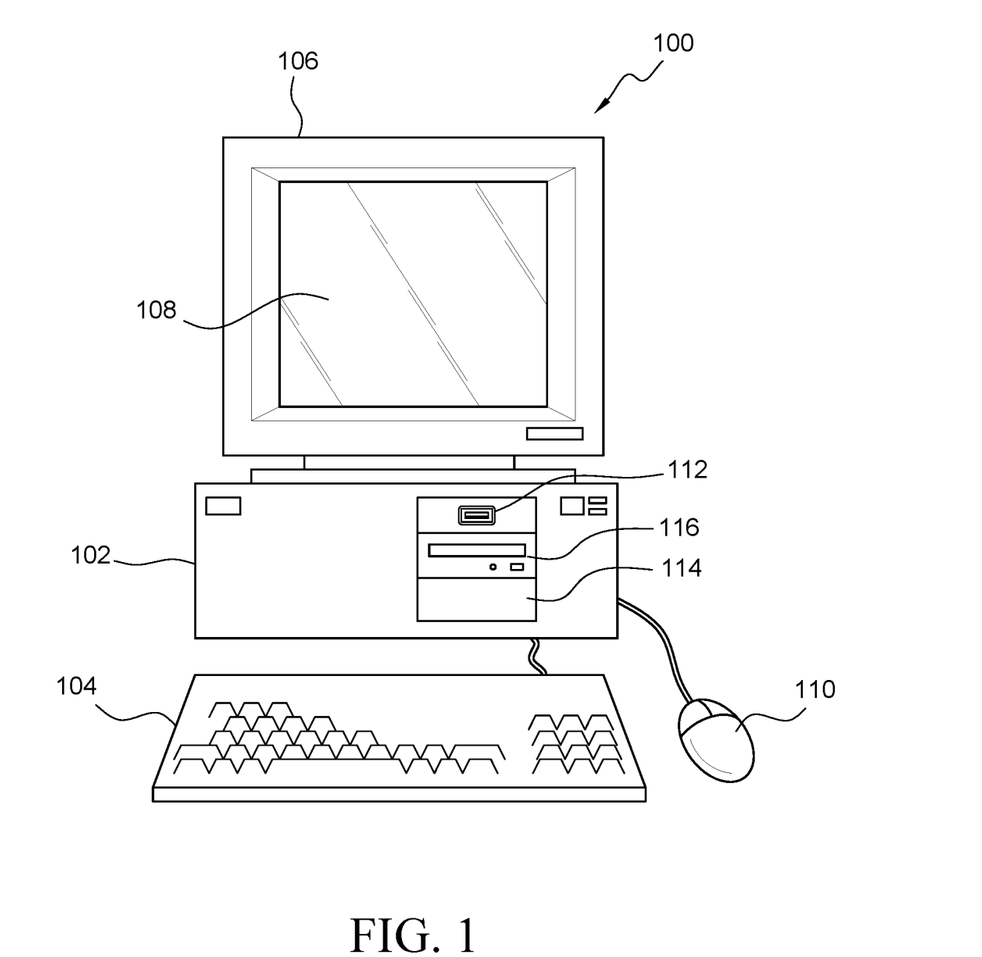
FIG. 1 illustrates a front elevational view of a computer system that is suitable for implementing various embodiments of the systems disclosed in FIGS. 3 and 5.
Figure 2:
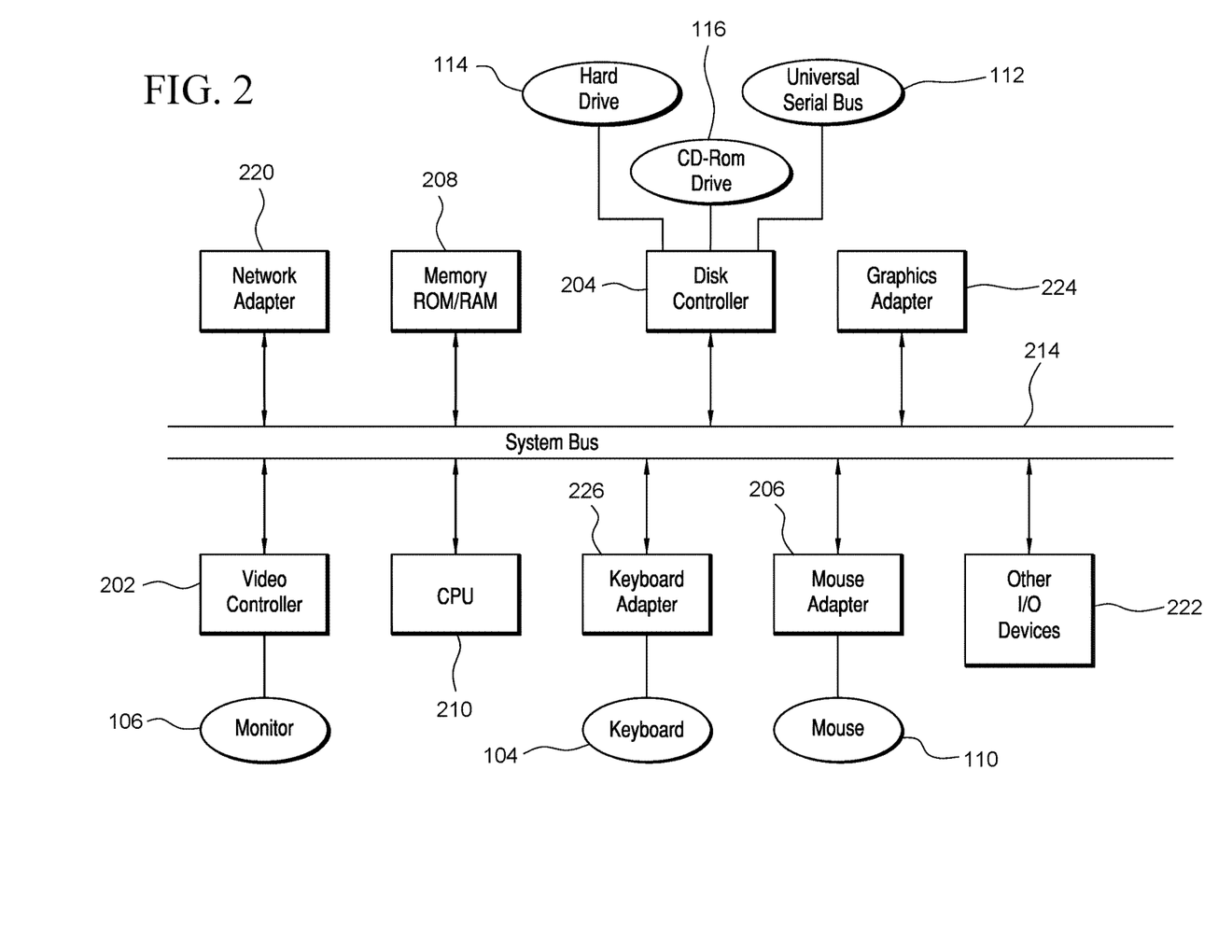
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
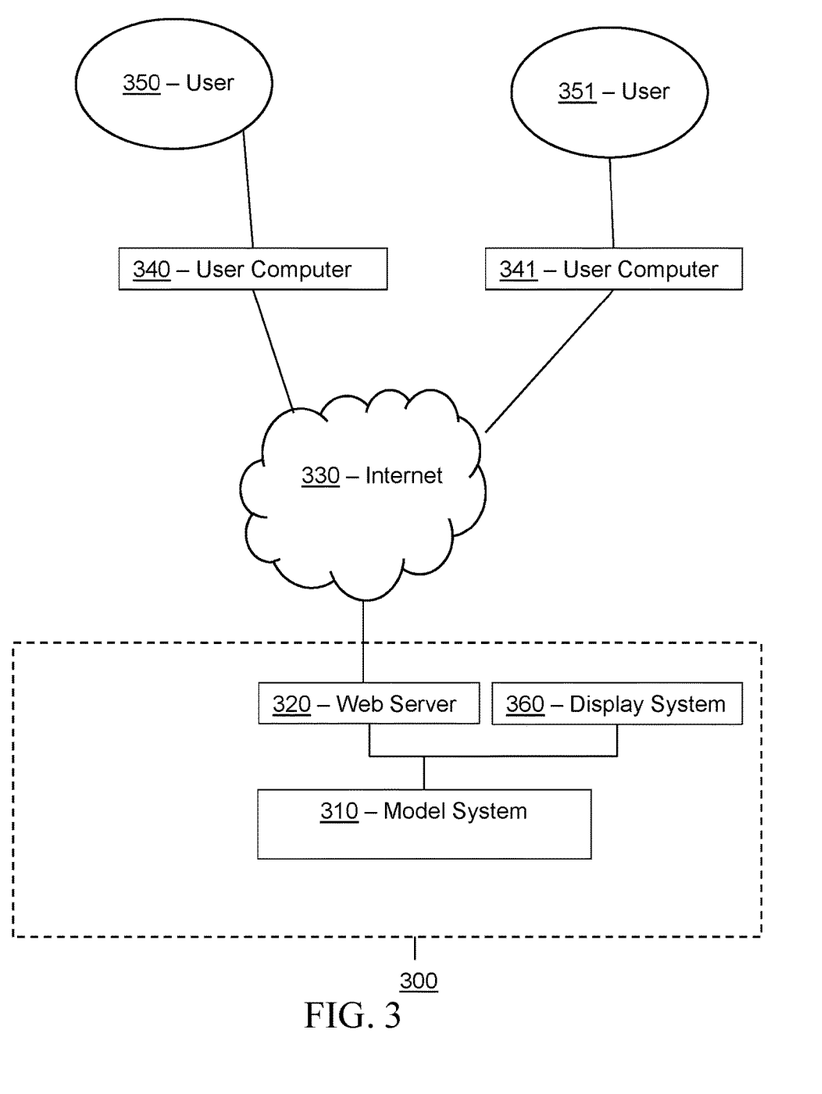
FIG. 3 illustrates a representative block diagram of a system, according to an embodiment.

Turning ahead in the drawings, FIG. 3 illustrates a block diagram of a system 300 that can be employed for recommending cold-start items on a website of an online retailer, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a model system 310, a web server 320, and/or a display system 360. Model system 310, web server 320, and/or display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of model system 310, web server 320, and/or display system 360. Additional details regarding parameter model system 310, web server 320, and/or display system 360 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, model system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) model system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of model system 310, web server 320, and/or display system 360. In a similar manner, the processing module(s) and the memory storage module(s) can be local and/or remote to each other.

In many embodiments, model system 310, web server 320, and/or display system 360 can be configured to communicate with one or more user computers 340 and 341. In some embodiments, user computers 340 and 341 also can be referred to as customer computers. In some embodiments, model system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, model system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, model system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between model system 310, web server 320, and/or display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Many online retailers often include recommended items on a webpage for a particular anchor item. To determine which items should be recommended on a webpage for the particular anchor item, the online retailer typically needs access to historical transaction data. For example, for each user of the online retailer, the online retailer finds similar users who have viewed or purchased similar items. This process, however, does not work for cold-start items because cold-start items have little or no historical data that can be observed to allow the retailer to make a recommendation.

Furthermore, acquiring data for cold-start items can be very difficult for the online retailer. For example, it is nearly impossible for an online retailer to acquire data for tens of millions of cold-start items, including the addition of a million new cold-start items every month. Exploring every combination of these tens of millions of items can take a significant amount of time and be a significant drain on computer operating systems.

To solve this problem that affects computer operating systems, many of the embodiments of this disclosure are configured to assess the relevance of cold-start items to users in an efficient manner that is not a drain on computer operating systems. The activities of embodiments of the systems and methods described in greater detail below (1) can require minimum explicit traffic to acquire needed information, (2) can be based on static item features or information, such as title, image, and/or description, (3) can be based on seller information, such as historical performance of the seller, and/or (4) can leverage knowledge from existing recommendations, and then transfer that knowledge to a cold-start recommendation problem.

Figure 4:
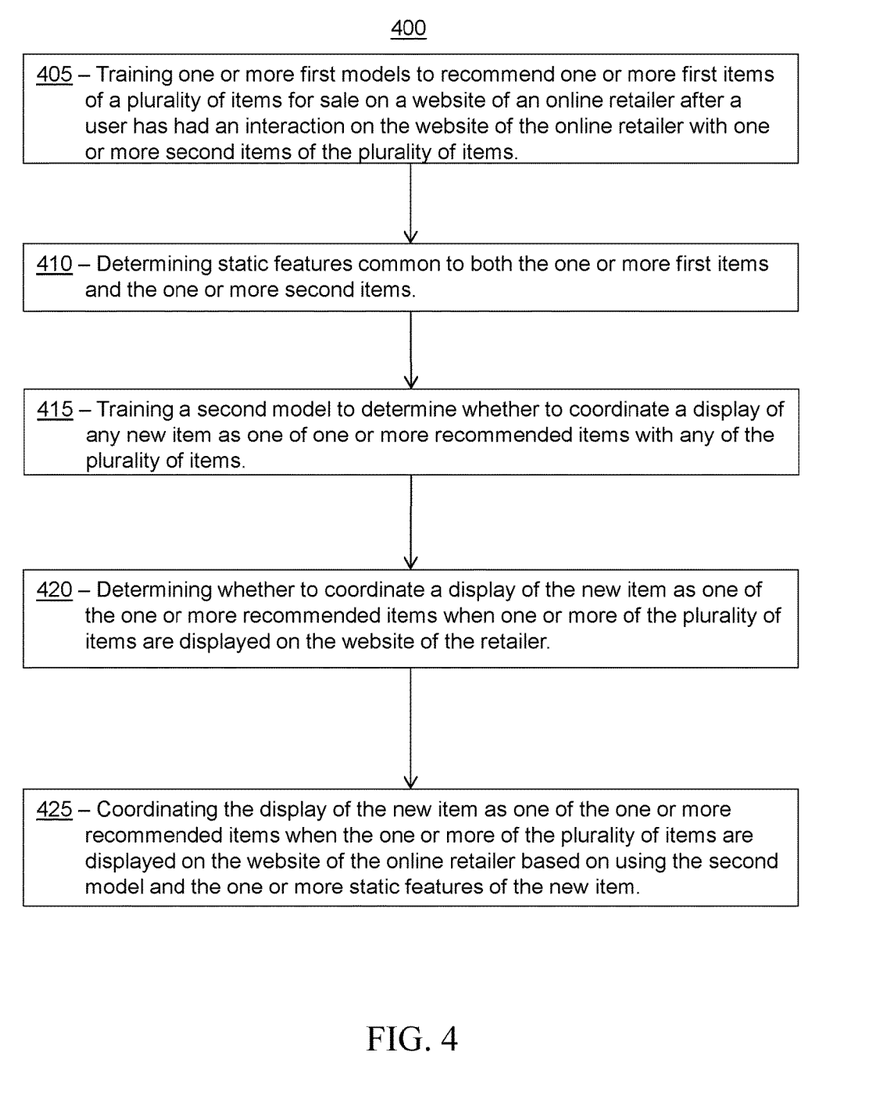
FIG. 4 is a flowchart for a method, according to certain embodiments.
Figure 5:
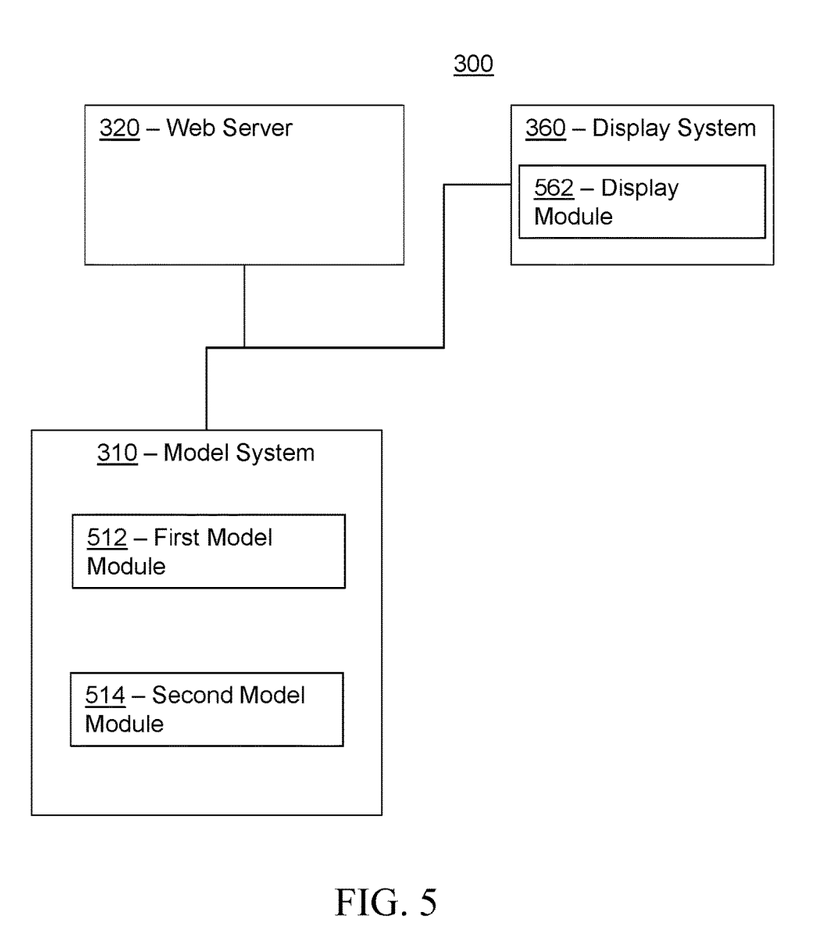
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, and/or 562 (FIG. 5). Such non-transitory memory storage modules can be part of a computer system such as model system 310, web server 320, and/or display system 360 (FIGS. 3 & 5). The processing module(s) can be similar or identical to the processing module(s) described above with respect to computer system 100 (FIG. 1).

In many embodiments, method 400 can comprise an activity of receiving or otherwise accessing historical traffic pattern data of a plurality of items for sale on a website of an online retailer. Accessing or receiving the historical traffic pattern data of the plurality of items can comprise using a distributed network comprising distributed memory architecture to access or receive the historical traffic pattern data. This distributed architecture can reduce the impact on the network and system resources to reduce congestion in bottlenecks while still allowing data to be accessible from a central location. In some embodiments, accessing the historical traffic pattern data is performed while a user is shopping on a website of the online retailer, e.g., when a user enters a search query, browses categories of products, and/or sorts products. In some embodiments, accessing the catalog is performed when system 300 (FIG. 3) receives new items on a daily and/or weekly basis.

Returning to FIG. 4, method 400 can comprise an activity 405 of training one or more first models to recommend one or more first items of a plurality of items for sale on a website of an online retailer after a user has had an interaction on the website of the online retailer with one or more second items of the plurality of items. The online retailer can comprise an exclusively online retailer or an online retailer that also comprises one or more brick and mortar retailer stores. In many embodiments the one or more first items do not overlap with the one or more second items. In many embodiments, training the one or more first models can comprise using a historical traffic pattern of a plurality of items on a website of an online retailer to train the one or more first models.

In many embodiments, the historical traffic pattern can comprise a number of different interactions of users with recommended items displayed on the webpage of an anchor item. For example, the historical traffic pattern can comprise a viewed-ultimately-bought (VUB) interaction, viewed-also-viewed (VAV) interaction, and/or a bought-also-bought (BAB) interaction. In a VUB interaction, a user views the webpage of a second item and ultimately buys a first item. Thus, if a user views a second item but ultimately purchases a first item, then the first item can be a good recommendation for an anchor item of the second item. In this VUB interaction, the user may or may not have viewed the first item before viewing the second item. In a VAV interaction, a user views the webpage of a second item and later also views the webpage of a first item during a single browsing session. Thus, if a user views both the second item and the first item in the same browsing session, then the first item can be a good recommendation for an anchor item of the second item. In a BAB interaction, a user buys a second item and later also buys a first item within a predetermined window of time.

Once recommendations are learned based on users' interactions, system 300 (FIG. 3) can determine that these different recommendations can be differentiated from one another using static information for the items and also can determine what static features might be considered as a good recommendations for each user experience. Returning to FIG. 4, method 400 also can comprise an activity 410 of determining static features common to both the one or more first items and the one or more second items. Static features can comprise but are not limited to a title, a description, an image, a price, a category, or item specifications for each item. Static features common to both the one or more first items and the one or more second items can comprise static features between the items that correlate with one another. For example, anchor items can have a set of static features, and recommendation items can have a set of static features. The static features which are common to both the anchor item and the recommendation item are the most useful static features for comparing anchor items and recommendations items. By way of further example, assume an anchor item comprises a laptop, and a recommendation item comprises a power cable. Both the laptop and the power cable comprise brand information, and whether the laptop and the power cable are of the same brand (i.e., both items are Apple® brand or both IBM® brand) can be important for measuring the relevance. Only the laptop, however, may include color information, as power cables usually do not include color information. Thus, color as a feature may not be very useful for the consideration to address correlation between static features of certain products.

In many embodiments, activity 410 can comprise determining the static features common to both the one or more first items and one or more second items using ensemble learning. The ensemble learning can comprise but is not limited to a blend of a set of models, the set of models comprising a linear model, a matrix factorization model, and a neural network model. Activity 410 also can comprise activities of labelling positive and negative training labels. For example, activity 410 can comprise an activity of labelling as positive training labels one or more existing recommendations of the one or more first items after the user has had the interaction on the web site of the online retailer with the one or more second items. Moreover, activity 410 also can comprise an activity of labelling as negative training labels additional items of the plurality of items not recommended after the user has had the interaction on the website of the online retailer with the one or more second items.

In many embodiments, the one or more first models can comprise a plurality of models. For example, the one or more first models can comprise different models for VUB interactions, VAV interactions, and/or BAB interactions. By way of non-limiting example, the one or more first models can comprise a VUB model configured to make a first recommendation of the one or more first items based on the VUB interaction of the user with the one or more second items and the one or more first items. The first recommendation can be based on a combination of (1) the one or more first items substituting for the one or more second items, and (2) the one or more first items complementing the one or more second items. For example, if a user views a second item but ultimately purchases a first item, then the first item can be a good recommendation for an anchor item of the second item. This recommendation can be a fusion or combination of substituting of the second item with the first item and also complementing the first item with the second item because a user may be purchasing the first item to either complement the second item or substitute for the second item.

The one or more first models also can comprise a VAV model configured to make a second recommendation of the one or more first items based on the VAV interaction of the user with the one or more second items and the one or more first items. The second recommendation can be based on the one or more first items substituting for the one or more second items. For example, if a user views the second item and then the first item in the same browsing session, then the first item can be a good recommendation for an anchor item of the second item. This recommendation can be a substitution recommendation of the first item to be a substitute for the second item. VAV recommendations usually look very similar to the anchor item which the user is viewing because the recommended product is likely a substitution item with similar functionality.

The one or more first models also can comprise a BAB model configured to make a third recommendation of the one or more first items based on the BAB interaction of the user with the one or more second items and the one or more first items. The third recommendation can be based on the one or more first items complementing the one or more second items. For example, if a user buys the second item and then also buys the first item within a short predetermined window of time, then the first item can be a good recommendation for an anchor item of the second item. This recommendation can be mostly a complementary substitution because the first item likely complements the second item. BAB recommendations usually look very different from the anchor item the user is viewing because the recommended product is likely a complement item with different functionality than the anchor item.

Once static features common between items of the plurality of items are identified, the learned common static features can be transferred to new cold-start items. Cold-start items can comprise new or old items with little or no historical traffic data. Continuing in FIG. 4, method 400 further can comprise an activity 415 of training a second model to determine whether to coordinate a display of any new item as one of one or more recommended items with any of the plurality of items. In many embodiments, activity 415 can comprise using the static features of the one or more first items and the one or more second items to train the second model to determine whether to coordinate a display of any new item as one of one or more recommended items with any of the plurality of items. Even more particularly, activity 415 can comprise training a probabilistic model to combine scoring from the one or more first models and determine whether to coordinate the display of the any new item as one of the one or more recommended items with any of the plurality of items.

In many embodiments, activity 415 can comprise accessing or receiving static features for a plurality of new items. Accessing or receiving the static features for the plurality of new items can comprise using a distributed network comprising distributed memory architecture to access or receive the static information of the plurality of new items. This distributed architecture can reduce the impact on the network and system resources to reduce congestion in bottlenecks while still allowing data to be accessible from a central location. In some embodiments accessing static features of the new products is performed while a user is shopping on a website of the online retailer, e.g., when a user enters a search query, browses categories of products, and/or sorts products. In some embodiments, accessing the static features for the plurality of new items is performed when system 300 (FIG. 3) receives new items and/or on a daily or weekly basis.

With a second model trained, the second model can be used to determine which cold-start items are good recommendations for an anchor item of the plurality of items and should be displayed as a recommended item with the anchor item. Returning to FIG. 4, method 400 additionally can comprise an activity 420 of determining whether to coordinate a display of the new item as one of the one or more recommended items when one or more of the plurality of items are displayed on the website of the retailer. In many embodiments, activity 420 can comprise using the second model and one or more static features of the new item to determine whether to coordinate the display of the new item as one of the one or more recommended items when one or more of the plurality of items is displayed on the website of the retailer.

In many embodiments, the cold-start items can be ranked in the process of determining what cold-start items should be used as recommended items. The cold-start items can be ranked in a ranking of cold-start items only or, alternatively, can be ranked in a ranking that includes both cold-start items and previously existing items with historical data. Thus, activity 420 also can optionally comprise an activity of determining a ranking of a plurality of new (or cold-start) items based on a likelihood of an additional user selecting each new item of the plurality of new items when the each new item is displayed as the one of the one or more recommended items when one or more of the plurality of items are displayed on the web site of the retailer.

In many embodiments, determining the ranking of the new cold-start items can comprise an activity of combining different user experiences. For example, given an item i which a user is viewing, the score y(j, i) of a user liking a cold-start item j based on the summation of $f_z(j, i)$ over different $z \in Z$ can be modeled, where each $z \in Z$ indicates a different type of experience. The different experience can be an experience of substitution of j for i, or can be an experience of j complementing i. $f_z$ is a function to score item j given i under experience z, and $w_z$ is a parameter which indicates the weight of each individual experience.

$$y(j, i) = \sum_{z \in Z} w_z f_z(j, i) + w_b b_j + w_c$$

In the above equation, $f_z(j, i)$ can be obtained from the underlying model trained specifically for experience z. This can be the VAV model, which is based on static item information and which is trained based on positive label obtained from a current VAV recommendation (which is generated based on traffic) and negative labels obtained from item samples which are not in a current VAV recommendation. $b_j$ can represent a bias term for a quality of the seller of item j, and also can model the prior knowledge on the quality of the seller of item j. It can be assumed that $b_j$ comes from a normal distribution with mean $\mu_j$, and variance $\sigma_j$, where $\mu_j$ and $\sigma_j$ are separately learned from the seller of item j. $w_b$ is the weight of the seller prior term. Thus, $b_j \sim N(\mu_j, \sigma_j)$. Finally, $w_c$ is a constant bias, and N is a normal distribution, where $\mu_j$ is the mean of the distribution and $\sigma_j$ is the variance of the distribution. This equation allows a score to be boosted based on the quality of a seller.

In many embodiments, ranking the new cold-start items also can optionally include activities of exploiting and further exploring the static information. In some embodiments, a Softmax function can be used to turn predicted scores (described above) of each individual cold-start item into a probabilistic distribution of candidate recommendation items for an item i a user is viewing.

$$P(j \mid i) = \frac{e^{y(j,i)}}{\sum j \in J e^{y(j,i)}}$$

Using the equation above, parameters $w_z$, $w_b$, $w_c$ of the model can be tuned using exploit/explore algorithms based on actual user feedback, where e is the mathematical constant e. Specifically, a Multi-Armed Bandit technique can be used to perform an exploit/explore strategy of the cold-start recommendation candidates. The exploit/explore strategy can be performed at any point of time when a user comes and visits an item page of item i. A score of each candidate cold-start item j can be obtained using P(j|i). P(j|i) can represent the probability of a user liking item j given the user having viewed item i. Following upper confidence bound strategy, a non-limiting example of an exploit/explore strategy, the top-k candidate cold-start items can be chosen, using the following equation, to present to the customer and then observe the feedback. C(j|i) is the confidence of the prediction of P(j|i) given the previously observed feedback. C(j|i) can be derived from a one-sided confidence interval from the cold-start items shown to the users and the observed feedback for items with score of P(j|i).

$$\pi(j \mid i) = P(j \mid i) + \alpha C(j \mid i)$$

where $\pi$ represents a score which can be leveraged for sampling different item j and $\alpha$ is a hyper-parameter which determine the weight of the term C(j|i). For an item with a large $\pi(j \mid i)$ value, the item has a higher chance of being selected to be recommended. For an item with a smaller $\pi(j \mid i)$ value, the item has a lower chance of being selected to be recommended. If a smaller $\alpha$ is used, then more weight is given to P(j|i) to exploit more item j which has the higher predicted score. If a larger $\alpha$ is used, then more weight is given to C(j|i) or uncertainty of the predicted value of P(j|i) to explore more item j which does not include enough certainty about a predicted score.

Parameters ($w_z$, $w_b$, $w_c$) can be shared with each arm (in this case each arm is a candidate cold-start item j), so that a compact representation of the model can be obtained. The model can be trained based on a limited amount of traffic. While previous works typically assume independent parameters for each arm, the amount of traffic needed for an application of tens of millions of arms/items quickly becomes infeasible.

In many embodiments, the quality of the seller also can affect whether or not a cold-start item should be selected for display as a recommended product. For example, even if the new cold-start item is determined, through static features, to be very relevant and a good recommendation for an anchor item, the new cold-start item nonetheless may not be a good recommendation because of the seller of the new cold-start item. More particularly, the seller may have a bad reputation from previous transactions, a low rating, a low transaction amount, bad customer service, etc. Thus, activity 420 also can optionally comprise an activity of determining a quality of the seller of each new item of the plurality of new items. Determination of the quality of the seller can be based on seller information. The seller information can comprise a list of items for sale, a number of reviews, ratings of the seller, and so on. For the list of items for sale, the list can comprise sales information and clicks information. The sale information can include revenue for a predetermined period of time. The clicks information can include a click-through-rate during the predetermined period of time. Because the quality of the seller can affect whether or not an item should be recommended, activity 420 also can comprise adjusting the ranking of the plurality of new items based on the quality of the seller of each new item of the plurality of new items.

After the second model has determined that a new cold-start item should be displayed as a recommended item for a particular anchor item, activities may be taken to display the new cold-start item as a recommended item for an anchor item. Continuing with FIG. 4, method 400 also can comprise an activity 425 of coordinating the display of the new item as one of the one or more recommended items when the one or more of the plurality of items are displayed on the website of the online retailer based on using the second model and the one or more static features of the new item. Thus, while there is little or no historic data for the new cold-start item, the static features of the new cold-start item can be correlated with an anchor item to improve a likelihood that a user will select the new-cold start item.

Other embodiments of method 400 can optionally comprise additional steps. For example, feedback can be observed, and the model can be improved through reinforcement learning. Thus, method 400 can optionally comprise an activity of collecting feedback comprising statistics of how many users selected the display of the new item when the new item was displayed as the one of the one or more recommended items when the one or more of the plurality of items were displayed on the website. Method 400 also can optionally comprise an activity of adjusting the second model through reinforcement learning based on the feedback.

FIG. 5 illustrates a block diagram of a portion of system 300 comprising model system 310, web server 320, and display system 360, according to the embodiment shown in FIG. 3. Each of model system 310, web server 320, and/or display system 360, is merely exemplary and not limited to the embodiments presented herein. Each of model system 310, web server 320, and/or display system 360, can be employed in many different embodiments or examples not specifically depicted or described herein. In some embodiments, certain elements or modules of model system 310, web server 320, and/or display system 360, can perform various procedures, processes, and/or acts. In other embodiments, the procedures, processes, and/or acts can be performed by other suitable elements or modules.

In many embodiments, model system 310 can comprise non-transitory memory storage module 512. Memory storage module 512 can be referred to as first model module 512. In many embodiments, first model module 512 can store computing instructions configured to run on one or more processing modules and perform one or more acts of method 400 (FIG. 4) (e.g., activity 405 of training one or more first models to recommend one or more first items of a plurality of items for sale on a website of an online retailer after a user has had an interaction on the website of the online retailer with one or more second items of the plurality of items, and activity 410 of determining static features common to both the one or more first items and the one or more second items (FIG. 4)).

In many embodiments, model system 310 can comprise non-transitory storage module 514. Memory storage module 514 can be referred to as second model module 514. In many embodiments, second model module 514 can store computing instructions configured to run on one or more processing modules and perform one or more acts of method 400 (FIG. 4) (e.g., activity 415 of training a second model to determine whether to coordinate a display of any new item as one of one or more recommended items with any of the plurality of items, and activity 420 of determining whether to coordinate a display of the new item as one of the one or more recommended items when one or more of the plurality of items are displayed on the web site of the retailer (FIG. 4)).

In many embodiments, display system 360 can comprise non-transitory storage module 562. Memory storage module 562 can be referred to as display module 562. In many embodiments, display module 562 can store computing instructions configured to run on one or more processing modules and perform one or more acts of method 400 (FIG. 4) (e.g., activity 425 of coordinating the display of the new item as one of the one or more recommended items when the one or more of the plurality of items are displayed on the website of the online retailer based on using the second model and the one or more static features of the new item (FIG. 4)).

Although systems and methods for recommending cold-start items on a website of an online retailer have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processing modules; and
    one or more non-transitory storage modules storing computing instructions configured to run on the one or more processing modules and perform acts of:
        training, using a historical traffic pattern of a plurality of items on a website of an online retailer, one or more first models to recommend one or more first items of the plurality of items for sale on the website of the online retailer after a user has had an interaction on the website of the online retailer with one or more second items of the plurality of items;
        determining static features common to both the one or more first items and the one or more second items;
        training, using the static features of the one or more first items and the one or more second items, a second model to determine whether to coordinate a display of any new item as one of one or more recommended items with any of the plurality of items;
        determining, using the second model and one or more static features of the new item, whether to coordinate a display of the new item as one of the one or more recommended items when one or more of the plurality of items are displayed on the website of the online retailer; and
        coordinating the display of the new item as the one of the one or more recommended items when the one or more of the plurality of items are displayed on the website of the online retailer based on using the second model and the one or more static features of the new item.

2. The system of claim 1, wherein determining the static features comprises determining, using ensemble learning, the static features common to both the one or more first items and the one or more second items, the static features comprising one or more of a title, a description, an image, a price, a category, or item specifications.

3. The system of claim 2, wherein the ensemble learning comprises a blend of a set of models, the set of models comprising a linear model, a matrix factorization model, and a neural network model.

4. The system of claim 1, wherein the one or more non-transitory storage modules storing the computing instructions are further configured to run on the one or more processing modules and perform acts of:
    labelling as positive training labels one or more existing recommendations of the one or more first items after the user has had the interaction on the website of the online retailer with the one or more second items; and
    labelling as negative training labels additional items of the plurality of items not recommended after the user has had the interaction on the website of the online retailer with the one or more second items.

5. The system of claim 1, wherein the interaction with the one or more second items comprises at least one of:
    a viewed-ultimately-bought (VUB) interaction wherein the user had viewed the one or more second items and ultimately bought the one or more first items;
    a viewed-also-viewed (VAV) interaction wherein the user had viewed the one or more second items and also viewed the one or more first items during a single browsing session; and
    a bought-also-bought (BAB) interaction wherein the user had bought the one or more second items and also bought the one or more first items within a predetermined window of time.

6. The system of claim 5, wherein the one or more first models comprise at least three first models comprising:
    a VUB model configured to make a first recommendation of the one or more first items based on the VUB interaction of the user with the one or more second items and the one or more first items, wherein the first recommendation is based on a combination of (1) the one or more first items substituting the one or more second items, and (2) the one or more first items complementing the one or more second items;
    a VAV model configured to make a second recommendation of the one or more first items based on the VAV interaction of the user with the one or more second items and the one or more first items, wherein the second recommendation is based on the one or more first items substituting the one or more second items; and a BAB model configured to make a third recommendation of the one or more first items based on the BAB interaction of the user with the one or more second items and the one or more first items, wherein the third recommendation is based on the one or more first items complementing the one or more second items.

7. The system of claim 1, wherein training the second model comprises training a probabilistic model to combine scoring from the one or more first models and determine whether to coordinate the display of the any new item as the one of the one or more recommended items with the any of the plurality of items.

8. The system of claim 1, wherein the one or more non-transitory storage modules storing the computing instructions are further configured to run on the one or more processing modules and perform acts of:
determining a ranking of a plurality of new items based on a likelihood of an additional user selecting each new item of the plurality of new items when each new item is displayed as the one of the one or more recommended items when one or more of the plurality of items are displayed on the website of the online retailer;
determining a quality of a seller of each new item of the plurality of new items; and
adjusting the ranking of the plurality of new items based on the quality of the seller of each new item of the plurality of new items.

9. The system of claim 1, wherein the one or more non-transitory storage modules storing the computing instructions are further configured to run on the one or more processing modules and perform acts of:
collecting feedback comprising statistics of how many users selected the display of the new item when the new item was displayed as the one of the one or more recommended items when the one or more of the plurality of items were displayed on the website; and
adjusting the second model through reinforcement learning based on the feedback.

10. The system of claim 1, wherein:
determining the static features comprises determining, using ensemble learning, the static features common to both the one or more first items and the one or more second items, the static features comprising one or more of a title, a description, an image, a price, a category, or item specifications, and the ensemble learning comprising a blend of a set of models, the set of models comprising a linear model, a matrix factorization model, and a neural network model;
the one or more non-transitory storage modules storing the computing instructions are further configured to run on the one or more processing modules and perform acts of:
labelling as positive training labels one or more existing recommendations of the one or more first items after the user has had the interaction on the website of the online retailer with the one or more second items; and
labelling as negative training labels additional items of the plurality of items not recommended after the user has had the interaction on the website of the online retailer with the one or more second items;
the interaction with the one or more second items comprises at least one of:

a viewed-ultimately-bought (VUB) interaction wherein the user had viewed the one or more second items and ultimately bought the one or more first items;
a viewed-also-viewed (VAV) interaction wherein the user had viewed the one or more second items and also viewed the one or more first items during a single browsing session; and
a bought-also-bought (BAB) interaction wherein the user had bought the one or more second items and also bought the one or more first items within a predetermined window of time;
the one or more first models comprise at least three first models comprising:
a VUB model configured to make a first recommendation of the one or more first items based on the VUB interaction of the user with the one or more second items and the one or more first items, wherein the first recommendation is based on a combination of (1) the one or more first items substituting the one or more second items, and (2) the one or more first items complementing the one or more second items;
a VAV model configured to make a second recommendation of the one or more first items based on the VAV interaction of the user with the one or more second items and the one or more first items, wherein the second recommendation is based on the one or more first items substituting the one or more second items; and
a BAB model configured to make a third recommendation of the one or more first items based on the BAB interaction of the user with the one or more second items and the one or more first items, wherein the third recommendation is based on the one or more first items complementing the one or more second items;
training the second model comprises training a probabilistic model to combine scoring from the one or more first models and determine whether to coordinate the display of the any new item as the one of the one or more recommended items with the any of the plurality of items; and
the one or more non-transitory storage modules storing the computing instructions are further configured to run on the one or more processing modules and perform acts of:
determining a ranking of a plurality of new items based on a likelihood of an additional user selecting each new item of the plurality of new items when each new item is displayed as the one of the one or more recommended items when one or more of the plurality of items are displayed on the website of the online retailer;
determining a quality of a seller of each new item of the plurality of new items;
adjusting the ranking of the plurality of new items based on the quality of the seller of each new item of the plurality of new items;
collecting feedback comprising statistics of how many users selected the display of the new item when the new item was displayed as the one of the one or more recommended items when the one or more of the plurality of items were displayed on the website; and
adjusting the second model through reinforcement learning based on the feedback.

11. A method comprising:
training, using a historical traffic pattern of a plurality of items on a website of an online retailer, one or more first models to recommend one or more first items of the plurality of items for sale on the website of the online retailer after a user has had an interaction on the website of the online retailer with one or more second items of the plurality of items;

determining static features common to both the one or more first items and the one or more second items;

training, using the static features of the one or more first items and the one or more second items, a second model to determine whether to coordinate a display of any new item as one of one or more recommended items with any of the plurality of items;

determining, using the second model and one or more static features of the new item, whether to coordinate a display of the new item as one of the one or more recommended items when one or more of the plurality of items are displayed on the website of the online retailer; and coordinating the display of the new item as the one of the one or more recommended items when the one or more of the plurality of items are displayed on the website of the online retailer based on using the second model and the one or more static features of the new item.

12. The method of claim 11, wherein determining the static features comprises determining, using ensemble learning, the static features common to both the one or more first items and the one or more second items, the static features comprising one or more of a title, a description, an image, a price, a category, or item specifications.

13. The method of claim 12, wherein the ensemble learning comprises a blend of a set of models, the set of models comprising a linear model, a matrix factorization model, and a neural network model.

14. The method of claim 11, further comprising:
labelling as positive training labels one or more existing recommendations of the one or more first items after the user has had the interaction on the website of the online retailer with the one or more second items; and
labelling as negative training labels additional items of the plurality of items not recommended after the user has had the interaction on the website of the online retailer with the one or more second items.

15. The method of claim 11, wherein the interaction with the one or more second items comprises at least one of:
a viewed-ultimately-bought (VUB) interaction wherein the user had viewed the one or more second items and ultimately bought the one or more first items;
a viewed-also-viewed (VAV) interaction wherein the user had viewed the one or more second items and also viewed the one or more first items during a single browsing session; and
a bought-also-bought (BAB) interaction wherein the user had bought the one or more second items and also bought the one or more first items within a predetermined window of time.

16. The method of claim 15, wherein the one or more first models comprise at least three first models comprising:
a VUB model configured to make a first recommendation of the one or more first items based on the VUB interaction of the user with the one or more second items and the one or more first items, wherein the first recommendation is based on a combination of (1) the one or more first items substituting the one or more second items, and (2) the one or more first items complementing the one or more second items;
a VAV model configured to make a second recommendation of the one or more first items based on the VAV interaction of the user with the one or more second items and the one or more first items, wherein the second recommendation is based on the one or more first items substituting the one or more second items; and
a BAB model configured to make a third recommendation of the one or more first items based on the BAB interaction of the user with the one or more second items and the one or more first items, wherein the third recommendation is based on the one or more first items complementing the one or more second items.

17. The method of claim 11, wherein training the second model comprises training a probabilistic model to combine scoring from the one or more first models and determine whether to coordinate the display of the any new item as the one of the one or more recommended items with the any of the plurality of items.

18. The method of claim 11, further comprising:
determining a ranking of a plurality of new items based on a likelihood of an additional user selecting each new item of the plurality of new items when each new item is displayed as the one of the one or more recommended items when one or more of the plurality of items are displayed on the website of the online retailer;
determining a quality of a seller of each new item of the plurality of new items; and
adjusting the ranking of the plurality of new items based on the quality of the seller of each new item of the plurality of new items.

19. The method of claim 11, further comprising:
collecting feedback comprising statistics of how many users selected the display of the new item when the new item was displayed as the one of the one or more recommended items when the one or more of the plurality of items were displayed on the web site; and
adjusting the second model through reinforcement learning based on the feedback.

20. The method of claim 11, wherein:
determining the static features comprises determining, using ensemble learning, the static features common to both the one or more first items and the one or more second items, the static features comprising one or more of a title, a description, an image, a price, a category, or item specifications, and the ensemble learning comprising a blend of a set of models, the set of models comprising a linear model, a matrix factorization model, and a neural network model;
the method further comprises:
labelling as positive training labels one or more existing recommendations of the one or more first items after the user has had the interaction on the website of the online retailer with the one or more second items; and
labelling as negative training labels additional items of the plurality of items not recommended after the user has had the interaction on the website of the online retailer with the one or more second items;
the interaction with the one or more second items comprises at least one of:
a viewed-ultimately-bought (VUB) interaction wherein the user had viewed the one or more second items and ultimately bought the one or more first items;
a viewed-also-viewed (VAV) interaction wherein the user had viewed the one or more second items and also viewed the one or more first items during a single browsing session; and a bought-also-bought (BAB) interaction wherein the user had bought the one or more second items and also bought the one or more first items within a predetermined window of time;

the one or more first models comprise at least three first models comprising:
- a VUB model configured to make a first recommendation of the one or more first items based on the VUB interaction of the user with the one or more second items and the one or more first items, wherein the first recommendation is based on a combination of (1) the one or more first items substituting the one or more second items, and (2) the one or more first items complementing the one or more second items;
- a VAV model configured to make a second recommendation of the one or more first items based on the VAV interaction of the user with the one or more second items and the one or more first items, wherein the second recommendation is based on the one or more first items substituting the one or more second items; and
- a BAB model configured to make a third recommendation of the one or more first items based on the BAB interaction of the user with the one or more second items and the one or more first items, wherein the third recommendation is based on the one or more first items complementing the one or more second items;

training the second model comprises training a probabilistic model to combine scoring from the one or more first models and determine whether to coordinate the display of the any new item as the one of the one or more recommended items with the any of the plurality of items; and the method further comprises:
- determining a ranking of a plurality of new items based on a likelihood of an additional user selecting each new item of the plurality of new items when each new item is displayed as the one of the one or more recommended items when one or more of the plurality of items are displayed on the website of the online retailer;
- determining a quality of a seller of each new item of the plurality of new items;
- adjusting the ranking of the plurality of new items based on the quality of the seller of each new item of the plurality of new items;
- collecting feedback comprising statistics of how many users selected the display of the new item when the new item was displayed as the one of the one or more recommended items when the one or more of the plurality of items were displayed on the website; and
- adjusting the second model through reinforcement learning based on the feedback.

* * * * *